US010175026B2

(12) United States Patent
Noonan

(10) Patent No.: US 10,175,026 B2
(45) Date of Patent: Jan. 8, 2019

(54) DEVICE, METHOD AND ENERGY PRODUCT-BY-PROCESS FOR LAUNCHING MAGNETIC PROJECTILES AND MOTIVATING LINEAR AND ROTATIONAL MOTION, USING PERMANENT MAGNETS OR MAGNETIZED BODIES

(71) Applicant: Mark J. Noonan, Rensselaer, NY (US)

(72) Inventor: Mark J. Noonan, Rensselaer, NY (US)

( * ) Notice: Subject to any disclaimer, the term of this patent is extended or adjusted under 35 U.S.C. 154(b) by 0 days.

(21) Appl. No.: 15/370,298

(22) Filed: Dec. 6, 2016

(65) Prior Publication Data

US 2017/0122696 A1    May 4, 2017

(51) Int. Cl.
*F41B 6/00* (2006.01)
*H02K 53/00* (2006.01)

(52) U.S. Cl.
CPC ............ *F41B 6/00* (2013.01); *H02K 53/00* (2013.01)

(58) Field of Classification Search
USPC ............................................. 124/3
See application file for complete search history.

(56) References Cited

U.S. PATENT DOCUMENTS

| | | | |
|---|---|---|---|
| 754,637 A | 3/1904 | Birkeland | |
| 811,913 A | 2/1906 | Poster | |
| 1,241,333 A | 9/1917 | Bowman | |
| 1,324,204 A | 12/1919 | Morris | |
| 1,985,254 A | 12/1934 | Huse | |
| 2,214,297 A | 9/1940 | Ferry | |
| 2,783,684 A * | 3/1957 | Yolcr | F41B 6/00 124/3 |
| 3,207,960 A | 9/1965 | MacDougal | |
| 3,550,936 A | 12/1970 | Puttick | |
| 4,432,333 A | 2/1984 | Kurherr | |
| 4,480,523 A * | 11/1984 | Young | F41B 6/006 124/3 |
| 4,673,369 A | 6/1987 | DiPietro | |
| 4,791,850 A | 12/1988 | Minovitch | |
| 4,870,888 A * | 10/1989 | Weldon | F41B 6/00 124/3 |
| 4,922,800 A | 5/1990 | Hoffman | |
| 4,960,760 A | 10/1990 | Wang et al. | |
| 5,017,549 A | 5/1991 | Robertson | |
| 5,105,713 A * | 4/1992 | Wirgau | F42B 6/006 102/517 |

(Continued)

*Primary Examiner* — Joshua E Freeman
(74) *Attorney, Agent, or Firm* — Jay R. Yablon

(57) ABSTRACT

A magnetic apparatus and related method and energy product-by-process to motivate linear or rotational motion, comprising: at least one magnet ring tier comprising a ring of a plurality of permanent magnets; a central core comprising a permanent magnet projectile movement channel, an axis of the channel aligned in a direction normal to a geometric plane defined by the magnet ring, and running through a geometric center of the magnet ring; and each of the permanent magnets mounted in the ring at a mount angle thereof, with the components of their polar alignments parallel to the central core all oriented in the same direction; wherein: if the polar alignment of a permanent magnet projectile was introduced with a particular duality-dependent orientation into the permanent magnet projectile movement channel, the magnetic forces between the ring magnets and the projectile would be capable of motivating the permanent magnet projectile relative to the channel.

21 Claims, 21 Drawing Sheets

(56) References Cited

U.S. PATENT DOCUMENTS

| | | | |
|---|---|---|---|
| 5,122,506 A | 6/1992 | Wang | |
| 5,133,242 A * | 7/1992 | Witt | F41B 6/00 102/522 |
| 5,168,118 A | 12/1992 | Schroeder | |
| 5,188,555 A | 2/1993 | Zbegner | |
| 5,217,948 A * | 6/1993 | Leung | F41B 6/00 102/440 |
| 5,699,779 A * | 12/1997 | Tidman | F41B 3/04 124/1 |
| 7,398,722 B1 * | 7/2008 | Sims, Jr. | F41B 6/006 124/3 |
| 7,614,393 B1 * | 11/2009 | Lu | F42B 6/006 124/3 |
| 8,701,539 B1 * | 4/2014 | Dreizin | F41B 6/00 124/3 |
| 9,341,435 B1 * | 5/2016 | Mansfield | F41B 6/003 |
| 9,962,710 B2 * | 5/2018 | Suderman | B03C 1/18 |
| 2003/0137377 A1 * | 7/2003 | Engel | F41B 6/003 335/220 |
| 2004/0020351 A1 * | 2/2004 | Yurievich | F41B 6/003 89/8 |
| 2005/0285452 A1 * | 12/2005 | Putman | F41B 6/003 310/12.07 |
| 2006/0027084 A1 * | 2/2006 | Schneider | F41B 6/003 89/8 |
| 2006/0113857 A1 * | 6/2006 | Honkura | H02K 1/2733 310/156.43 |
| 2008/0223853 A1 * | 9/2008 | Muller | F25B 21/00 219/672 |
| 2013/0225035 A1 | 8/2013 | Miller | |
| 2014/0209079 A1 * | 7/2014 | Proulx | F41B 6/006 124/3 |
| 2016/0310962 A1 * | 10/2016 | Suderman | B03C 1/18 |
| 2016/0372999 A1 * | 12/2016 | Matsui | F41F 3/10 |
| 2017/0343314 A1 * | 11/2017 | Hartman | F41B 6/003 |
| 2018/0038355 A1 * | 2/2018 | Nakamura | F03G 7/00 |

* cited by examiner

DEVICE, METHOD AND ENERGY PRODUCT-BY-PROCESS FOR LAUNCHING MAGNETIC PROJECTILES AND MOTIVATING LINEAR AND ROTATIONAL MOTION, USING PERMANENT MAGNETS OR MAGNETIZED BODIES

BACKGROUND OF THE INVENTION

This invention pertains to a circular construction of permanent magnets that will do work on magnetized bodies or permanent magnets attached to non-magnetic weights such as lead. Manufactured arrays may be married ad infinitum at regular and specific intervals to unify the individual fields and sum magnetic forces enabling increased workload through the center of the array. These may also be assembled into closed configurations to motivate rotation or motion along a linear path of the magnet arrays.

SUMMARY OF THE INVENTION

Disclosed herein is a magnetic apparatus and related method and energy product-by-process to motivate linear or rotational motion, comprising: at least one magnet ring tier comprising a ring of a plurality of permanent magnets; a central core comprising a permanent magnet projectile movement channel, an axis of the channel aligned in a direction normal to a geometric plane defined by the magnet ring, and running through a geometric center of the magnet ring; and each of the permanent magnets mounted in the ring at a mount angle thereof, with the components of their polar alignments parallel to the central core all oriented in the same direction; wherein: if the polar alignment of a projectile comprising at least one permanent magnet were to be introduced with a particular duality-dependent orientation into the permanent magnet projectile movement channel, the magnetic forces acting between the ring magnets and the projectile would be capable of motivating the permanent magnet projectile relative to the channel.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) summarized below.

DETAILED DESCRIPTION

Figure 1:
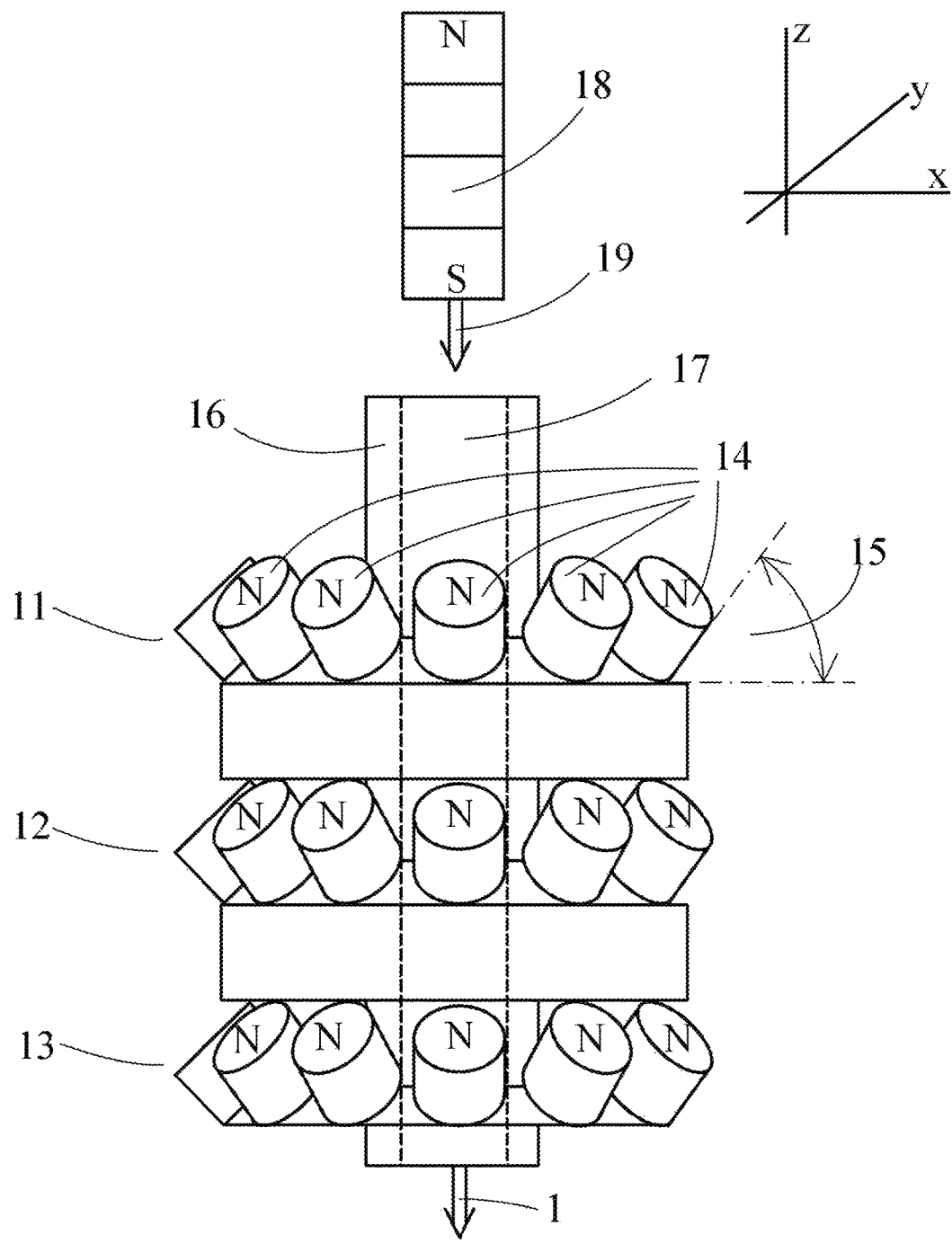
FIG. 1 is a side plan view illustrating the basic functional configuration of the invention comprising one or more tiers of permanent magnet rings, whereby a permanent magnet projectile can be "shot" through the permanent magnet rings.

The basic functional layout of the invention is illustrated by FIG. 1. In this drawing which is illustrative and not limiting, we see at least one—and in this illustrative case exactly three—tiers 11, 12, 13 of permanent magnet rings. Each such ring comprises a plurality of permanent magnets 14 arranged in a ring as shown, and also mounted on the rings at a mount angle 15 as shown. Additionally, the poles of the magnets within in each ring are oriented in the same direction, as are the poles from one tier to the next. So as illustrated, the north poles of all these permanent magnets 14 are oriented upward and outward, with the south poles thus oriented downward and inward. Conversely, one could also have all of the south poles oriented upward and outward, with the north poles oriented downward and inward. It is these like-polar orientations within each ring and across all rings which are important. Passing axially through the centers (geometric origins) of these permanent magnet rings 11, 12, 13 is a central core 16, and fabricated running through the central core 16 is a permanent magnet projectile movement channel 17 illustrated between the hidden lines. As will be seen, an axis of this channel is aligned in a direction normal to the geometric plane defined by the magnet rings, and runs through the geometric centers (origins) of the rings.

Further, we provide a separate permanent magnet or a bound cluster of permanent magnets, which is illustrated here, for example not limitation, by a four-magnet cluster bound together by the magnetic fields of each magnet within the cluster. We shall refer to this as a permanent magnet projectile 18, and there is no limitation as to how long this projectile might be, i.e., as to how many individual permanent magnets might contain, or curves of multiple magnets or use of manufactured curved magnets or of any magnetized body. The diameter of the permanent magnet projectile movement channel 17 is fabricated to be slightly larger than the diameter of the permanent magnet projectile 18 such that when the permanent magnet projectile 18 is inserted into the permanent magnet projectile movement channel 17, there will be just enough play, on the order of millimeters, for the permanent magnet projectile 18 to move freely in an axial direction 19 through the movement channel 17. We may also restate this by saying that the diameter of the permanent magnet projectile 18 is slightly smaller than that of the movement channel 17, by no more than a few millimeters, e.g., less than 10 millimeters with all intermediate distances included, and preferably close to 1 or 2 or 3 millimeters.

With this basic configuration of permanent magnets, now we turn to the operational characteristics of this invention. It should now be understood that the upward- and outward-facing north poles in the rings 11, 12, 13 of FIG. 1 possess a geometric component oriented upward along the z axis as well as components oriented outward through the xy plane. So we may align the permanent magnet projectile 18 such that its poles are also oriented in the same z axis component direction as the poles of the permanent magnets 14 in the illustrative rings 11, 12, 13. In other words, for these magnets, the components of their polar alignments (the line running from the south to the north pole) are parallel to the central core 16, and are all oriented in the same direction. So if we next press the permanent magnet projectile 18 into the permanent magnet projectile movement channel 17, then the overall configuration of magnetic fields will naturally bring about the following dynamical results, which have been demonstrated in experimental testing:

Initially, there will some mild force pressing upwards against the introduction of the permanent magnet projectile 18 into the permanent magnet projectile movement channel 17. However, at sufficient penetration, a threshold is crossed, such that the permanent magnet projectile 18 is suddenly drawn into the permanent magnet projectile movement channel 17, passes rapidly though the channel 17, and is projected out of the far end (lower end in FIG. 1) of the channel 17 as indicated by the shot direction 1. That is, the permanent magnet projectile 18 will actually "shoot" out the far end of the channel 17 with substantial velocity and momentum, as a result of the totality of the magnetic fields of both the permanent magnets 14 in the rings 11, 12, 13, and the magnetic fields of the permanent magnet projectile 18. In this sense, the ring configuration 11, 12, 13 operates as a "gun" with the permanent magnet projectile movement channel 17 being the "barrel" of the gun, and the projectile operates as a "bullet," all motivated by the magnetic field configurations.

To be sure, the velocity and momentum achieved by the permanent magnet projectile 18 are of a non-lethal magnitude, whereby this configuration is better-suited to be used as a "toy" gun rather than a real weapon. Recognizing that permanent magnets can always be reproduced by coils carrying currents, a configuration in which the permanent magnets 14 could be replaced magnet-by-magnet with coils producing the same fields could enhance the strength of the magnetic fields beyond the strengths available from permanent magnets, in which case this type of configuration might be used as the basis for a real gun and not just a toy gun.

With the foregoing, we have illustrated the basic configuration and operation of this invention. Starting from this baseline of understanding, we may now begin to discuss the various components of this invention, and a range of configurations which are possible building upon the foregoing.

Figure 2:
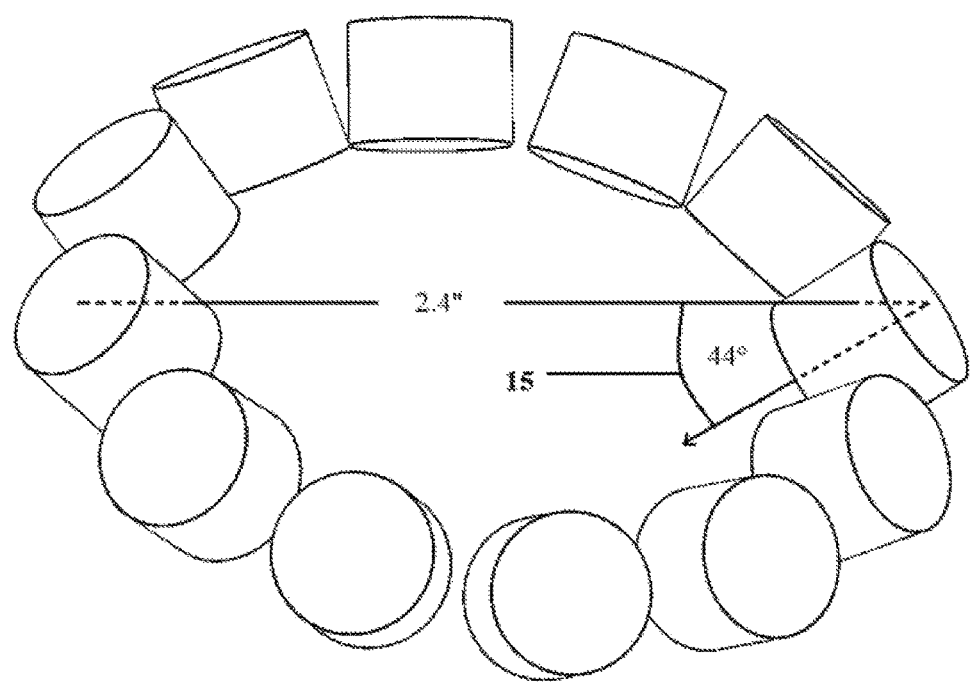
FIG. 2 is a schematic perspective view illustrating a single ring of permanent magnets in accordance with preferred embodiments of the invention.

FIG. 2 is a perspective view illustrating a single ring of permanent magnets 14, such as ring 11 illustrated in FIG. 1. For example, not limitation, the ring diameter is shown to be 2.4 inches, and the mount angle 15 is shown to be 44°. For example, not limitation, this ring is fabricated using with the illustrated twelve (12) magnets, which may be, for example not limitation, neodymium cylinder magnets which each have a ½" diameter and ⅜" height having a residual flux density of 13200 gauss and a weight of 1/20 lb. The geometry of the ring is arrived at by positioning the facial circle center of like poles at equal distances from each other onto a 2.4 inch diameter circle in the xy plane (see FIG. 1) while facing the other pole facial centers at the origin so that a central axis intersecting the center of each circular face of each cylinder intersects the origin. Keeping the center point of the like faces which touch the circle fixed, the other end is moved in the negative z direction until line through the center of each cylinder intersects the negative z axis and makes the mount angle 15 with the xy plane.

During the development of prototypes for experimental design testing, it has been found that construction is difficult, because the repulsive magnetic forces between like-poles are very large at the minute distances shown. The shortest distance between magnets in this array is only a few hundredths of an inch. Construction is demanding, and the engineering goal is to be able to minimize the distances between the bottom faces of the adjacent magnets. Note that if one substitutes electromagnetic coils for the permanent magnets 14 on a magnet-by-magnet basis, then this construction problem is overcome, because the magnetic fields can be turned off during construction simply by not flowing any current through the coils. However, the strength and durability of the housing used to contain and position the magnets is still important, because once currents are flowed through the coils, there will be very large repulsive forces introduced proximate the bases (south poles in FIG. 1) of the magnets, and the housing must be strong enough to withstand this.

Figure 3:
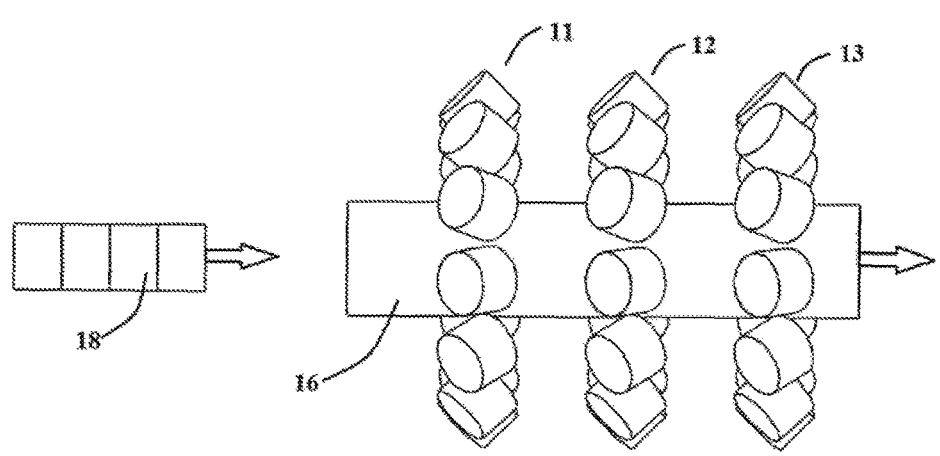
FIG. 3 illustrates a constructed array of permanent magnet rings similar to FIG. 1.

FIG. 3 illustrates a constructed array of such rings 11, 12, 13, similar to the earlier FIG. 1. All poles face in an identical direction as outlined earlier, and the centerlines of the individual cylinders are made to be coincident. A piece of, for example, PVC pipe is fixed in the exact center of the arrays to form the central core 16 enclosing the permanent magnet projectile movement channel 17, see FIG. 1. Then, some quantity of magnets comprising the permanent magnet projectile 18, with all poles shown pointing in the same general direction, is pushed into the pipe until resistance is overcome and the permanent magnet projectile 18 shown on the left is accelerated when the forward end reaches a certain threshold position in the vicinity of the first ring array encountered (11 in FIG. 1). Consequently, it will exit the tube on the right as a projectile.

Experimental testing reveals that the illustrated array of FIG. 1 will exert enough force on two pounds of magnets to escape the field of the array as a projectile if those magnets are launched horizontally. The result is dependent upon dynamic variables such as angle of the magnets in the constructed arrays, frictional force of the PVC, how symmetrically the magnets are aligned, and the close proximity of other magnetic and ferromagnetic materials.

Testing to date reveals that this projectile effect remains active no matter how many ring arrays 11, 12, 13 etc. are tiered together in series as long as some proper distance is maintained. The distance illustrated in FIG. 1 is approximately 9/16". Indeed, by increasing the number of arrays, and/or by varying the angle 15 of the magnets in each ring, and/or by varying the number of magnets installed in each ring (i.e., by increasing the ring diameter), and/or by varying the spacing between individual arrays while keeping centers of arrays coincident along a common desired path, the projectile velocity grows or diminishes based on these foregoing parameter variations.

Here, a denoted separation of 9/16" between ring tiers along a straight line is used for illustration, although the distance may be varied to yield maximum velocity. If arrays are too distant from one another, the acceleration ceases because the momentum of the projectile is unable to overcome the resistive force and the projectile magnets become pinned in the field generated between the two separated units and cease to move. At the distances illustrated the magnet projectile passes through all arrays and is accelerated away from the construction and projected out the far end. So the 9/16" distance and the angle of the magnets and the number of magnets and other parameters, are illustrated as an example without limitation. These are design parameters which can be varied to achieve optimization of emergent projectile velocities.

Figure 4:
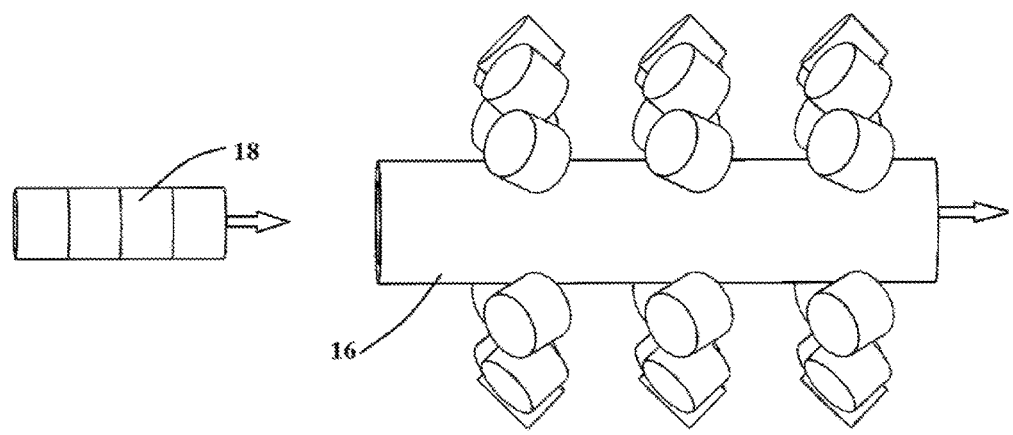
FIG. 4 shows the array of FIG. 3 with one magnet removed from each ring array.
Figure 5:
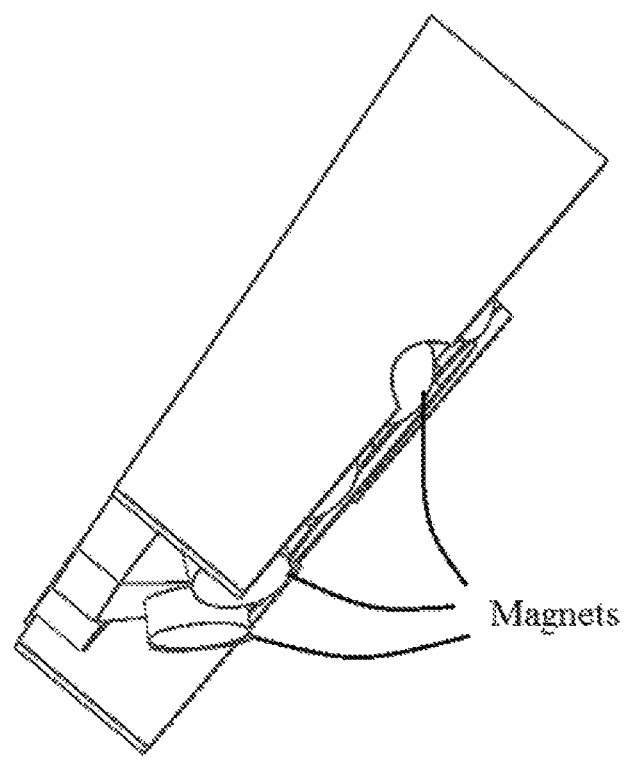
FIG. 5 shows the array centered in a wedge shaped containment, to enable the configuration of FIG. 6.

FIG. 4 shows the array of FIG. 3 with one magnet removed from each ring array from the same relative position. The projectile effect is somewhat lessened but losses to workload acceleration are small. Based on this, FIG. 5 shows the array centered in a wedge shaped containment that facilitates mounting on a six degree segment of a 16.15" diameter circle (for illustration not limitation) where the midpoint of the small side of the wedge is coincident with the circle's perimeter. The dimensions are chosen because of empirical observations during testing to the effect when arrays are moved slightly apart, one needs to know the maximum bending one may do and still maintain acceleration of the permanent magnet projectile 18 through multiple arrays. One side is made slightly smaller and one slightly larger in order to be able to bend the series of rings into a circular configuration. The void created by the removed magnet in allows material to be removed from the construction so that the ring arrays may be configured into a circle (wheel) motivated by fixing the permanent magnetic projectile 18, all of which we shall now review in some detail.

Figure 6:
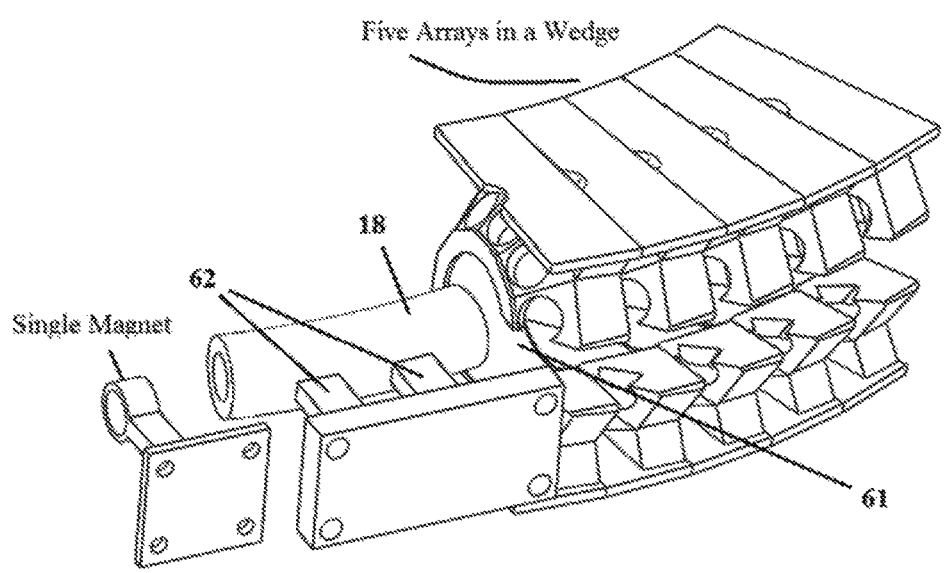
FIG. 6 shows a schematic section of magnet arrays configured into a "wedge" for incorporation into a circular "wheel" and mounting on an axle (not shown, see FIG. 20, however, where this is shown), and the permanent magnet projectile mounted to a fixed position, whereby the projectile now rotates the magnets comprising the wheel, rather than the magnets remaining fixed and launching the projectile.
Figure 22:
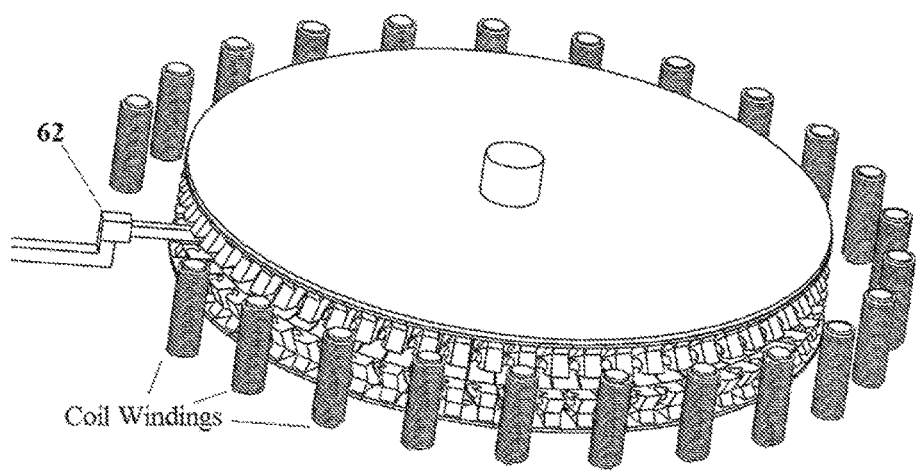
FIG. 22 is a plan view illustrating a plurality of windings of electric wire proximate the fixed magnets comprising the wheel, which can be used to extract electric currents and thereby electrical power from the rotation of the wheel.

FIG. 6 now illustrates a way of using magnetic bodies to drive the magnet ring arrays, instead of using the rings arrays to drive magnetic bodies (or magnetic bodies attached to non-magnetic weights such as lead). If the arrays are mounted on a surface with a center axle (not shown, however, see FIG. 19 where this is shown), the arrays will rotate such an assembly about the axle once the force of initial resistance to the entrance of the magnetic driving piece or pieces is overcome. That is, if one spins the whole array towards the driving magnets and overcomes the resistance, the entire array will accelerate tangentially about the axle, and then maintain a rotation. Let us review this step by step:

Referring to FIG. 6, with a wedge 61 taken out from the ring arrays 11, 12, 13 so that the permanent magnet projectile 18 can now be fixed 62 to an external location, and with the arrays no longer linear as in FIG. 1 but now circular, the relative roles of the array and the projectile are reversed. Now, rather than the projectile being "shot" out from a fixed array of magnet rings, the array can be mounted on an axle so that it is the mobile part of the invention, while the projectile can be fixed 62 so that rotation is imparted to the array. Once rotation is imparted to the array, that rotation itself becomes a source of energy that can then effectively be harnessed from the magnetic fields via the application of well-known principles from turbine/rotor systems. FIG. 22 infra, also shows an alternative means of harvesting energy from this rotation, using wire coils and capitalizing on Faraday's law of induction.

In simple terms, if FIG. 1 is analogized to a "gun" which is held fixed to shoot a "bullet," then FIG. 6 is analogized to a "bullet" which is held fixed in order to shoot a "gun." But the "gun" is not shot in a linear direction because it is configured into a wheel, so that the motion imparted to the "gun" by the "bullet" becomes rotational rather than linear. In effect, once is harnessing the "recoil" of the "gun" into a rotational motion motivated by the permanent magnets held fixed, and the way they are mutually configured.

With these basic principles elaborated, now we shall review a succession of drawings to conceptually illustrate the building up of this system from its component magnetic elements, as well as configurations of fixed magnet housings which housings can be used to assemble and maintain the magnets in their required geometric configurations.

Figure 7:
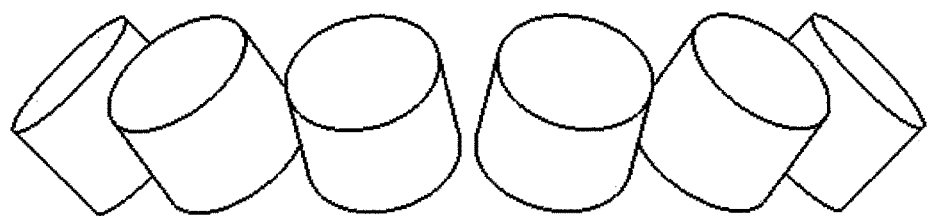
FIG. 7 is a side view showing the geometric interrelation of one side of a ring of permanent magnets.
Figure 8:
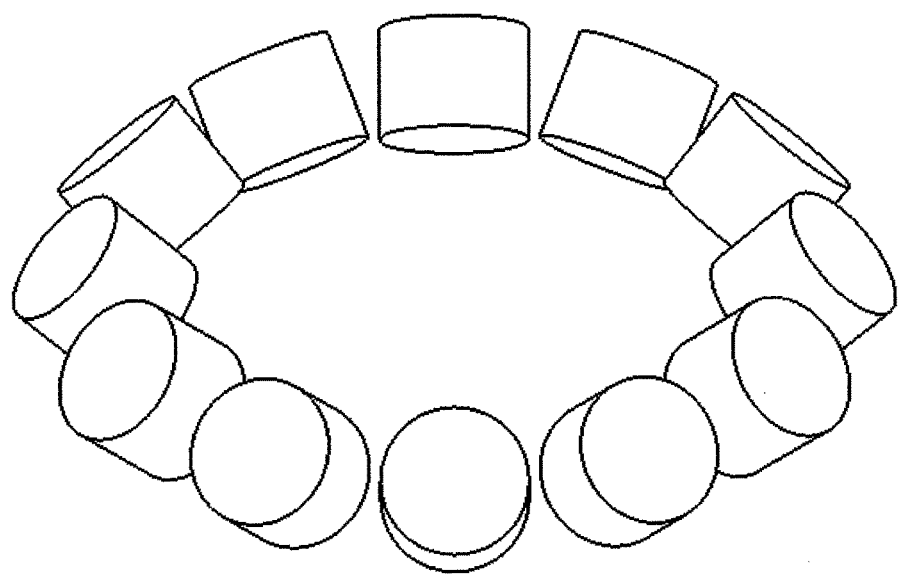
FIG. 8 is a perspective view showing the geometric interrelation of an entire ring of permanent magnets.
Figure 9:
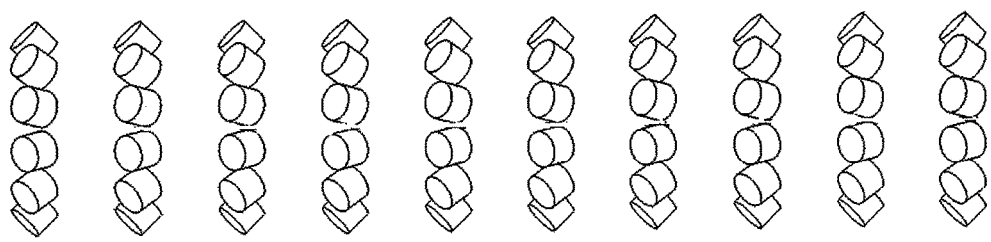
FIG. 9 is side plan view showing the geometric interrelation of ten (10) tiers of permanent magnet rings.
Figure 10:
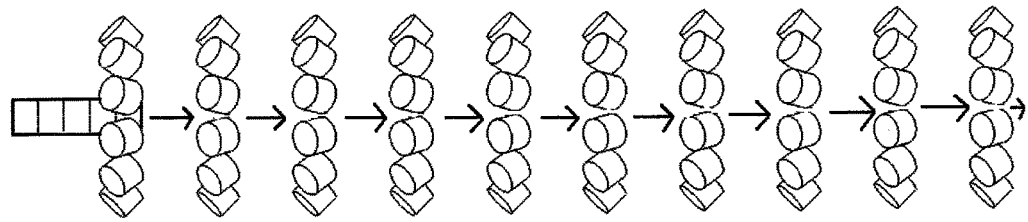
FIG. 10 is a side plan view illustrating a permanent magnet projectile being launched through the ten (10) tier system of FIG. 9.

FIG. 7 shows the geometric interrelation of one side of a ring of permanent magnets. FIG. 8 shows a perspective view an entire such ring of permanent magnets, and FIG. 9 shows ten (10) tiers of permanent magnet rings, adding on to the three rings shown in FIGS. 1 and 4. FIG. 10 illustrates a permanent magnet projectile being launched through the ten (10) tier system of FIG. 9.

Figure 11:
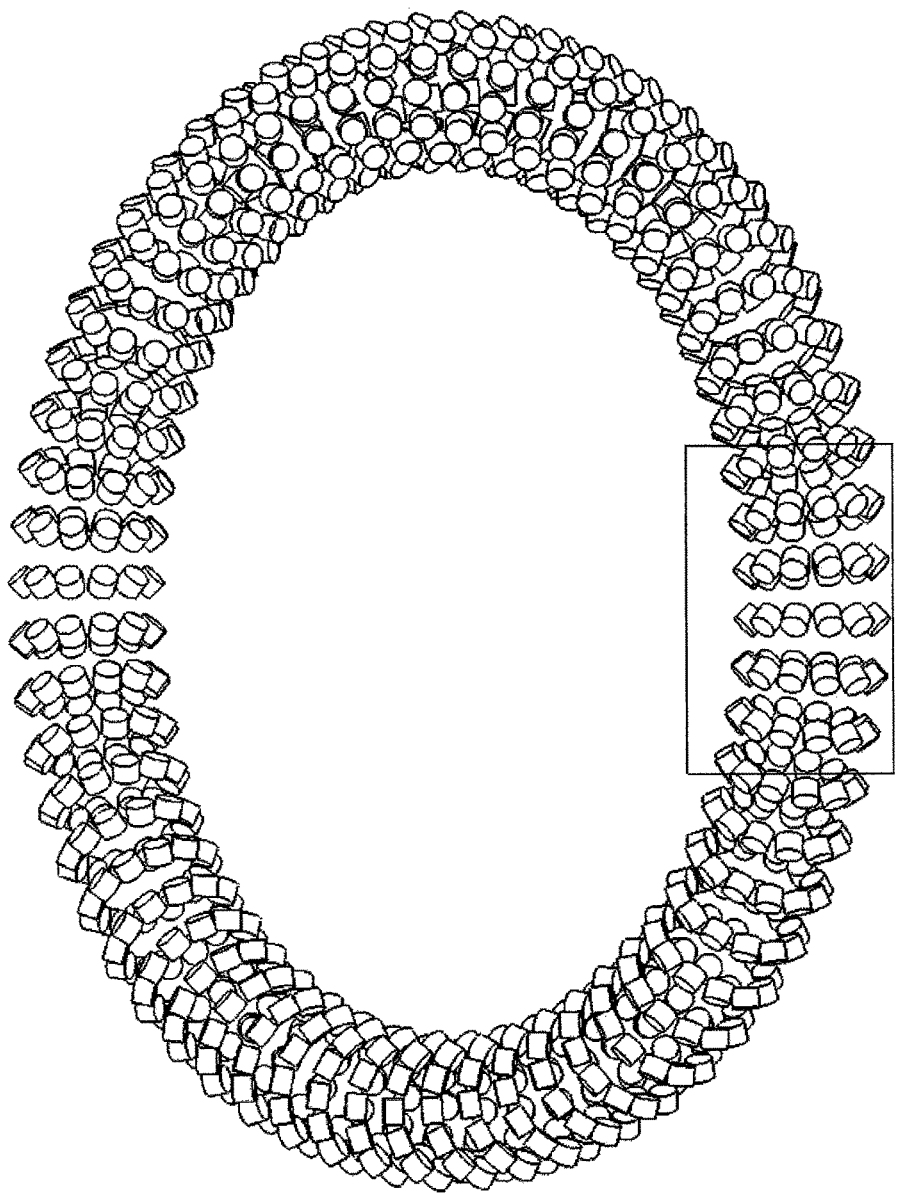
FIG. 11 is a side plan view illustrating the linear configuration for FIG. 9 curved just enough so as to be assembled into a wheel of rings, of which a section was earlier shown in FIG. 6.
Figure 12:
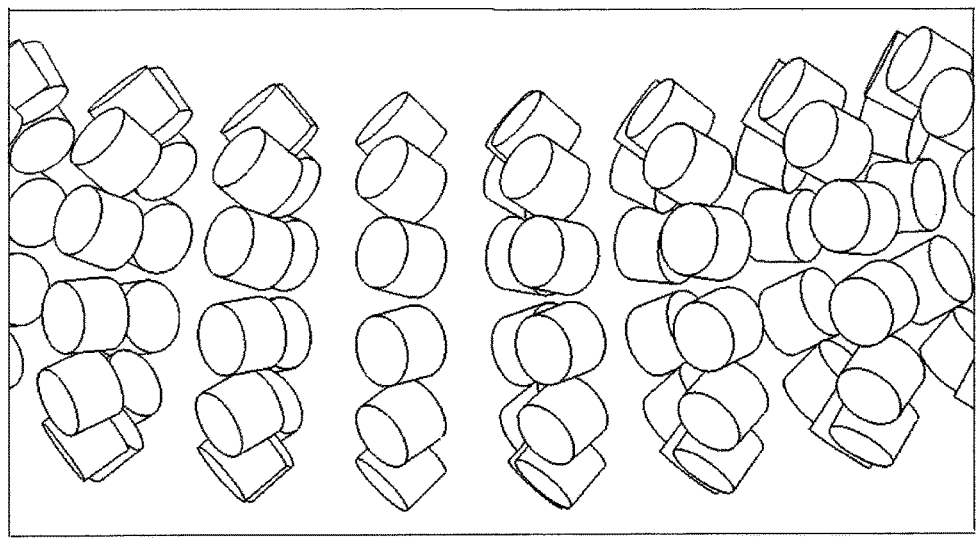
FIG. 12 is a side plan view containing an enlargement of the box toward the lower portion of FIG. 11, which will also be seen to resemble FIG. 9 but with a mild curve added.

Working from FIG. 9, FIG. 11 now shows the linear configuration of FIG. 9 curved just enough so as to be assembled into a wheel of rings, of which a section was earlier shown in FIG. 6. FIG. 12 shows an enlargement of the box toward the lower portion of FIG. 11, which will also be seen to resemble FIG. 9 but with a mild curve added. It is FIG. 11 which illustrates the desired configuration of rings of magnets assembled into a wheel, which underlies the wheel embodiments of the invention. Now, as an engineering matter, one needs to design and construct mounting housings which will retain the magnets in the geometric configuration of FIG. 11. That is the subject of the next several figures.

Figure 13:
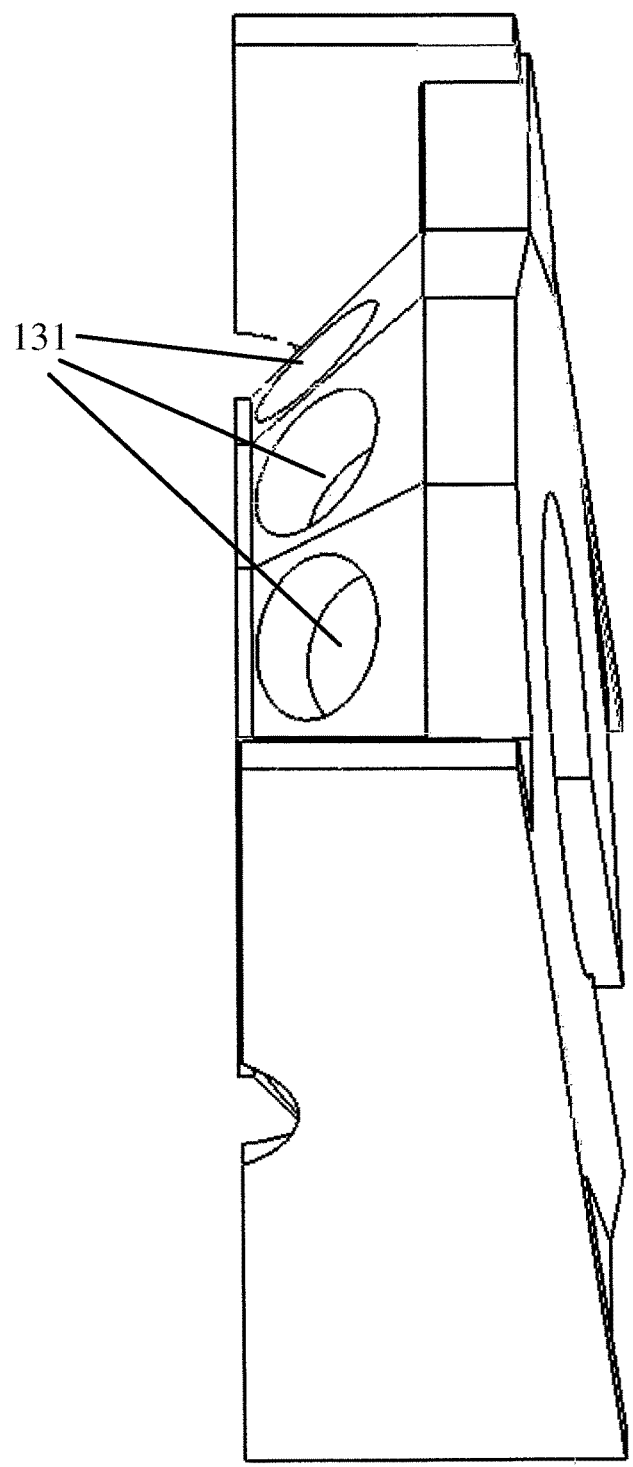
FIG. 13 is a side plan view illustrating mounting hardware that can be utilized to assemble permanent magnets into the previously-described configurations.
Figure 14:
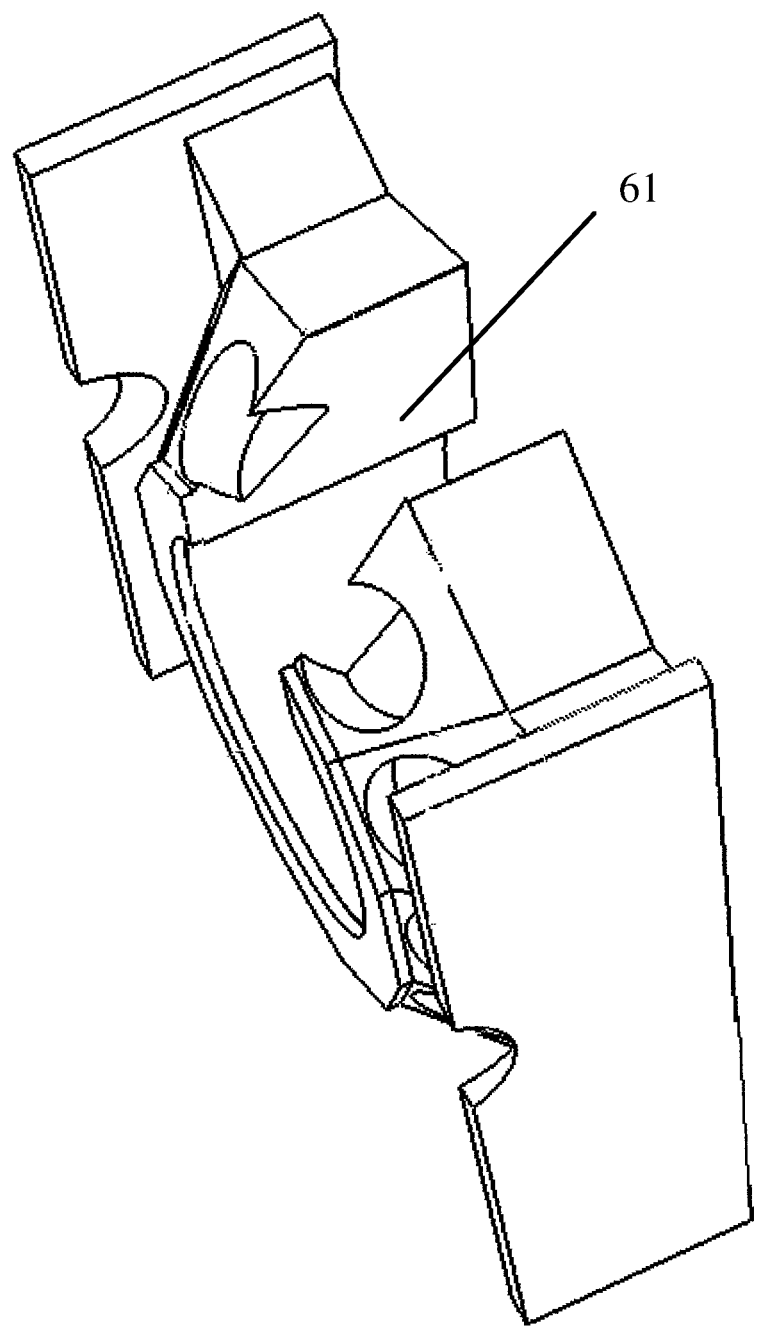
FIG. 14 is a perspective view of the FIG. 13 mounting hardware, including the wedge taken out from the ring arrays as shown in FIG. 5 so that the permanent magnet projectile can now be fixed to an external location, as earlier shown in FIG. 6.
Figure 15:
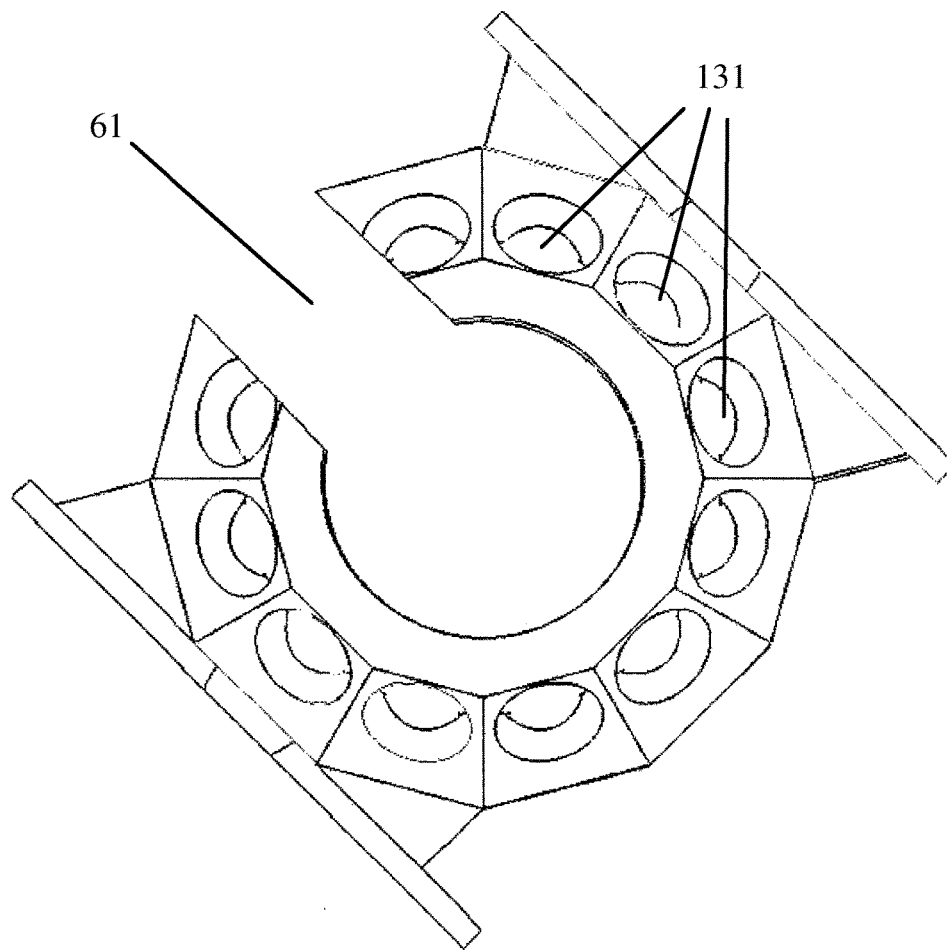
FIG. 15 is a top plan view of FIGS. 13 and 14.
Figure 16:
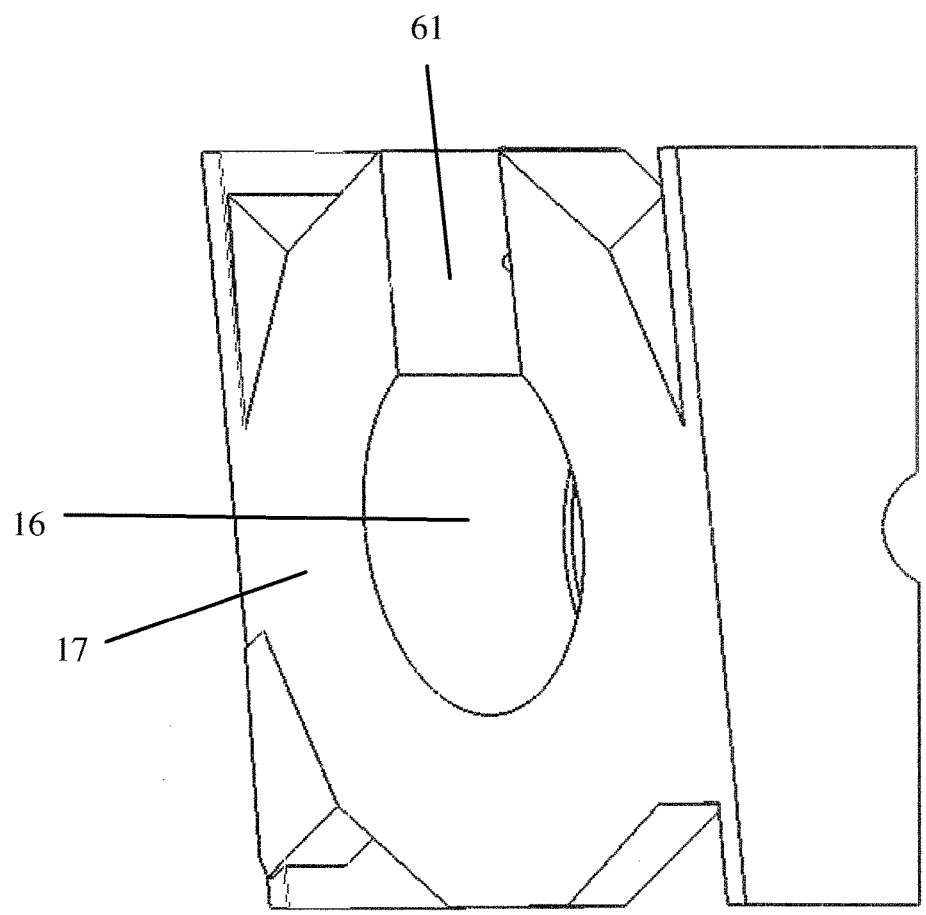
FIG. 16 is a bottom perspective view of the central core and permanent magnet projectile movement channel, as well as the wedge used for the wheel configuration of FIG. 6.

FIG. 13 illustrates a magnet housing that can be utilized to assemble permanent magnets 14 into the previously-described geometric magnet configurations. During manufacturing, the permanent magnets 14 are simply placed and then tightly adhered into magnet receptacles 131. Strong adhesives, and even better, industrial-strength welds may be used for this purpose. FIG. 14 is a perspective view of the FIG. 13 mounting hardware, including the wedge 61 taken out from the ring arrays as shown in FIG. 5 so that the permanent magnet projectile 18 can now be fixed 62 to an external location, as earlier shown in FIG. 6. This is also shown from a top plan view in FIG. 15. FIG. 16 then shows a bottom perspective view of the central core 16 and permanent magnet projectile movement channel 17, as well as the wedge 61 used for the wheel configuration of FIG. 6. So taken together, FIGS. 13 through 16 illustrate the magnet housing for a single tier of magnet rings such as 11, seen from four different views.

Figure 17:
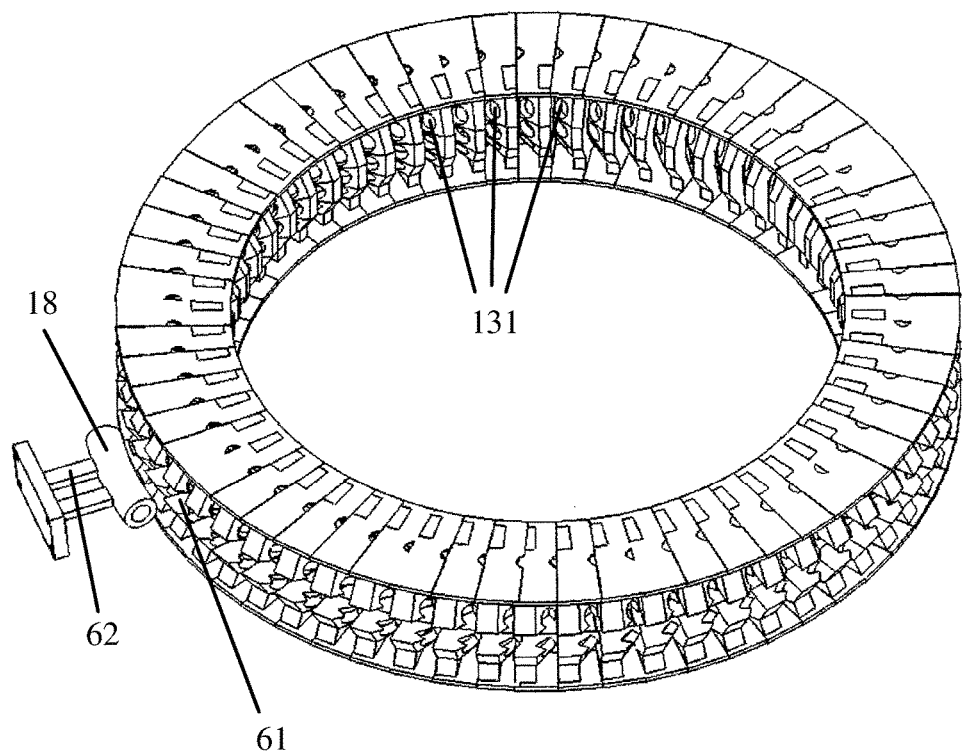
FIG. 17 is a perspective view of the mounting hardware for the wheel configuration of FIG. 6.

FIG. 17 is a perspective view of the magnet housing hardware for the wheel configuration of FIG. 6. We see the notches 61 all about the outer circumference of the wheel, a large plurality of magnet receptacles 131 into which the individual permanent magnets are adhered, and the permanent magnet projectile 18 fixed 62 to an external location. It will be appreciated by comparing FIGS. 11 and 17 (reversing the parity of one or the other) that the housing in FIG. 17 is designed for the very purpose and is precisely suited for holding the permanent magnets 14 in the geometric configuration of FIG. 11.

Figure 18:
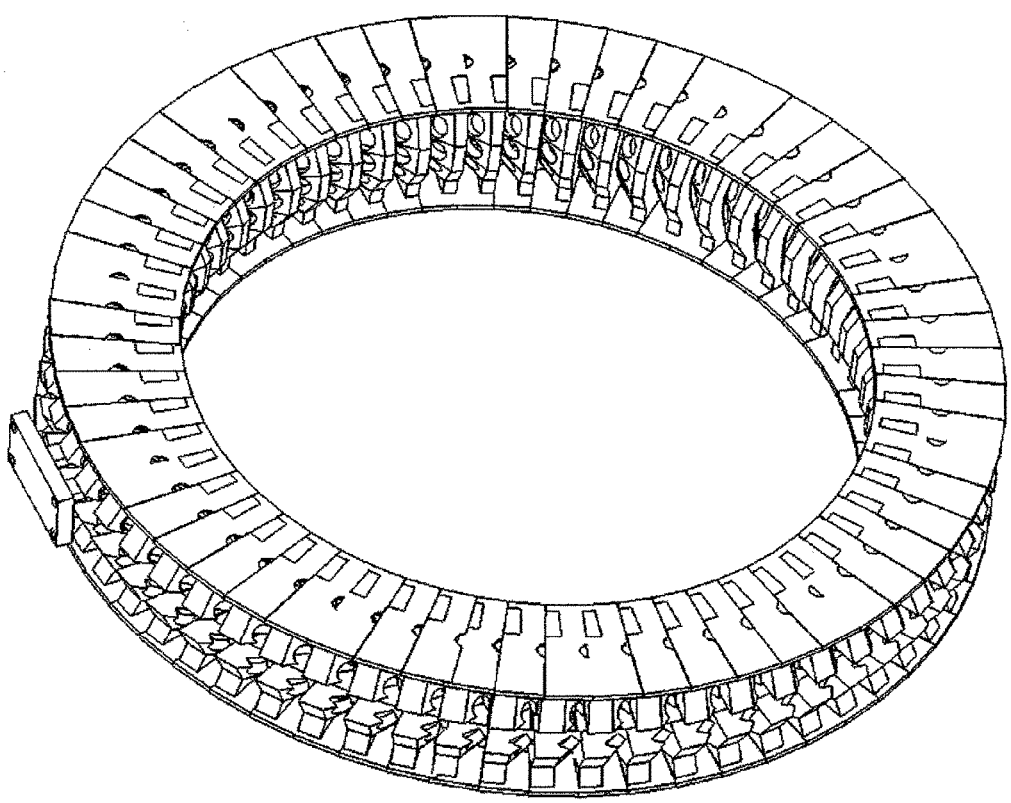
FIG. 18 is a perspective view of the mounting hardware for the wheel configurations of FIGS. 6 and 17, once the permanent magnet projectile is situated inside the permanent magnet projectile movement channel of the central core in order to motivate rotation of the wheel once the wheel is mounted about an axle (not shown) at its central origin.

Then, as illustrated by FIG. 18, when the permanent magnet projectile 18 is situated inside the permanent magnet projectile movement channel 17 of the central core 16, and the wheel is mounted about an axle (not shown) at its central origin, then after the wheel is imparted some rotation, the interaction between the now-fixed permanent magnet projectile 18 and the magnets in the various rings will motivate the wheel to continue spinning for a time proportional to the force applied as a result of the magnetic field interactions and the initial impulse imparted to begin rotation.

This is as was earlier described in connection with FIG. 6. In essence, again using the "gun" analogy whereby the relative motions of "gun" and "bullet" are reversed, the "bullet" is held in a fixed position while the mildly-curved gun "barrel" "recoils" from the "firing" of the projectile, which firing is motivated entirely by magnetic interactions between the "wheel gun" mounted on an axle, and the "fixed bullet." As a result, the interaction energy between the various fixed magnets maintains the rotation of the wheel, and this rotational energy can then be harnessed for other purposes using known turbine/rotor technologies, and/or the wire coils which will be discussed momentarily in relation to FIG. 22.

Figure 19:
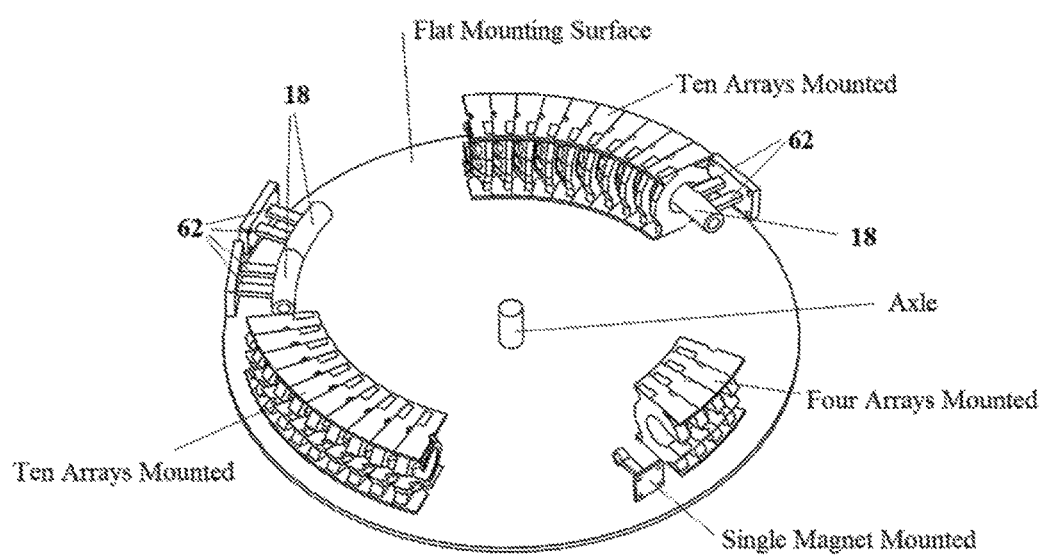
FIG. 19 is a sectional plan view illustrating several wedge sections as disclosed in FIG. 6, forming part of the overall magnet wheel that spins about an axle in response to one or more permanent magnet "projectiles" which are fixed in place as also shown in FIG. 6.

FIG. 19 illustrating several wedge sections as disclosed in FIG. 6, forming part of the overall magnet wheel that spins about an axle in response to one or more permanent magnet "projectiles" which are fixed in place as also shown in FIG. 6.

Figure 20:
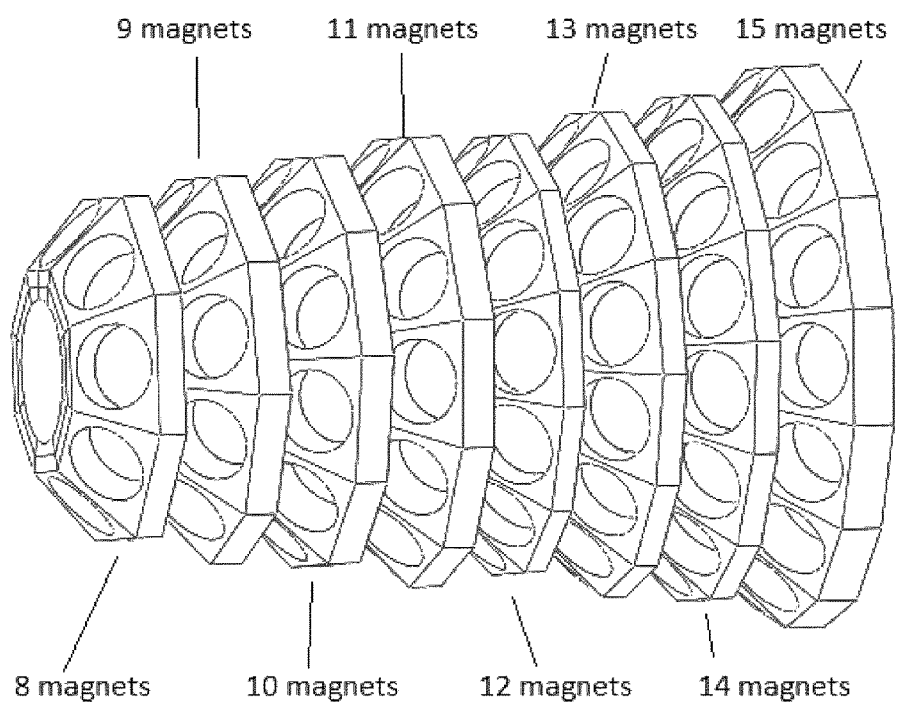
FIG. 20 is a plan view illustrating an alternative embodiment, for example not limitation, in which the number of permanent magnets in the tiers of permanent magnet rings varies from one tier to the next.
Figure 21:
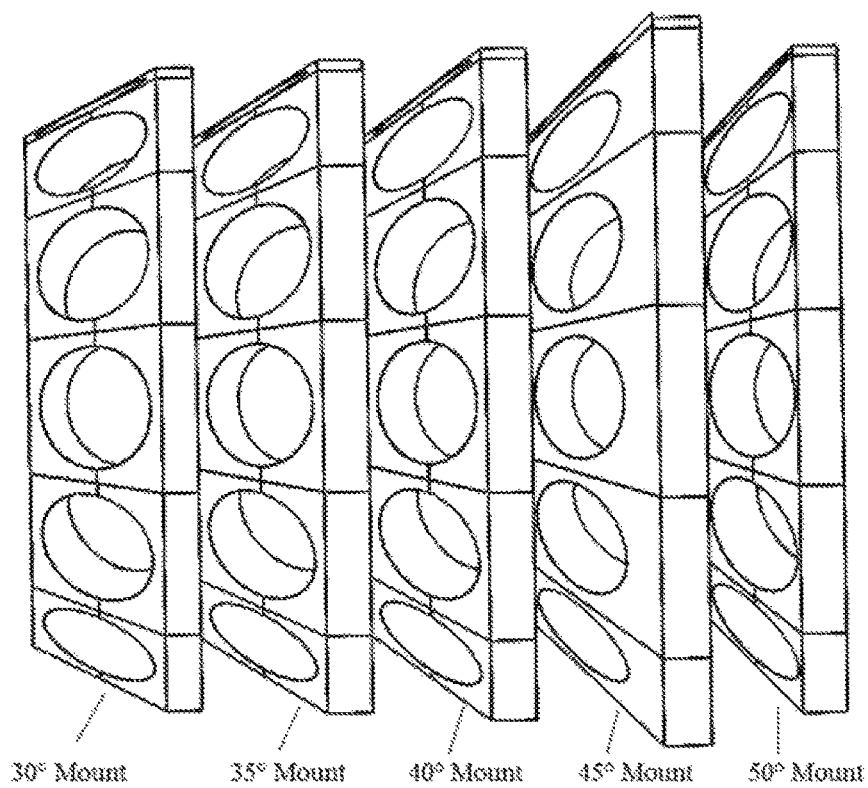
FIG. 21 is a plan view illustrating an alternative embodiment, for example not limitation, in which the angles of the permanent magnets in the tiers of permanent magnet rings vary from one tier to the next.

Although the drawings to this point have illustrated the number of magnets, and the angle of the magnets in each magnet ring tier being the same from one tier to the next, it is important to emphasize that this is for example only, and not by way of limitation. Consequently, it is understood, as illustrated by the alternative embodiment of FIG. 20, that the number of permanent magnets in the tiers of permanent magnet rings can be varied from one tier to the next. And it is also understood, as illustrated by the alternative embodiment of FIG. 21, that the angles of the permanent magnets in the tiers of permanent magnet rings can likewise be varied from one tier to the next. Although not explicitly illustrated, it should further be understood that both the FIG. 20 and FIG. 21 variations may also be employed together, with variations in both the magnet numbers and the magnet angles from one tier to the next. All of these variations are available for deployment in the event the engineering considerations in any particular situation warrant their utilization.

FIG. 22 is a plan view now showing one or more of coil windings of electric wire proximate the fixed magnets comprising the wheel. It will be appreciated by anyone with a basic knowledge of classical electromagnetic theory that this type of arrangement can be used to extract electric currents and thereby electrical power from the rotation of the wheel.

Specifically, each tier of fixed magnets within the wheel will be spaced relative to the adjacent tiers, see e.g., FIGS. 1, 3, 4 regarded as linear approximations to a wheel section, with the illustrative not limiting 9/16" spacing, as well as FIGS. 6, 11, 12 and 17-19 for the wheel embodiment itself. Therefore, as the wheel rotates, because of this tier spacing, there will be a time variation in the magnetic fields passing through finite surface areas near the periphery of the wheel. By Faraday's law of induction, which is one of Maxwell's equations, namely:

$$\oint E \cdot dl = -\frac{d}{dt} \int \int B \cdot dS; \nabla \times E = -\frac{dB}{dt}$$

in integral and differential form respectively, the time-dependent d/dt flow of the magnetic field B integrated over nearby two-dimensional surface area elements dS will be non-zero as a consequence of this configuration of the permanent magnets within the wheel. Therefore, the electric field E will have a non-zero curl parallel to the circumference of each loop, causing electrons within the loop wires to flow and thus motivating an electric current in the wires comprising these coil loops.

In fact, the magnetic fields at any fixed point near the periphery of the rotating wheel will have a periodic character, oscillating between increased and decreased strength as the wheel rotates. Therefore, it is expected that the time derivative will also be oscillatory, whereby the electric currents can be expected to be alternating currents not direct currents.

The orientation of the coils shown in FIG. 22 as being perpendicular to the plane and to the circumference of the wheel, is illustrative and non-liming. These coils may also be disposed tangentially parallel or even parallel with like-curvature, to the circumference of the wheel. Or, these coils can be engineered for disposition at any angle or orientation in relation to the wheel, as required to optimize current generation from the time-varying magnetic fields. The maximization of currents generated, is achieved by maximizing the time-dependent magnetic field changes flowing through the open surfaces of the coils.

So geometrically aligning the open surfaces of the coils so as to maximize the dB/dt flowing through those closed magnetic flux surfaces becomes the dominant engineering goal. It is thus understood that any coil orientation which causes the time derivative of $\int\int B \cdot dS$ to not be zero through these coils and thus $\oint E \cdot dl$ to not be zero around these coils, as well as engineering the geometry of all elements of the invention to maximize the magnitudes of the time derivative d/dt of $\iint B \cdot dS$ through these coils and thus maximize $\oint E \cdot dl$ around these coils, is to be regarded as being within the scope of this disclosure and its associated claims.

Figure 23:
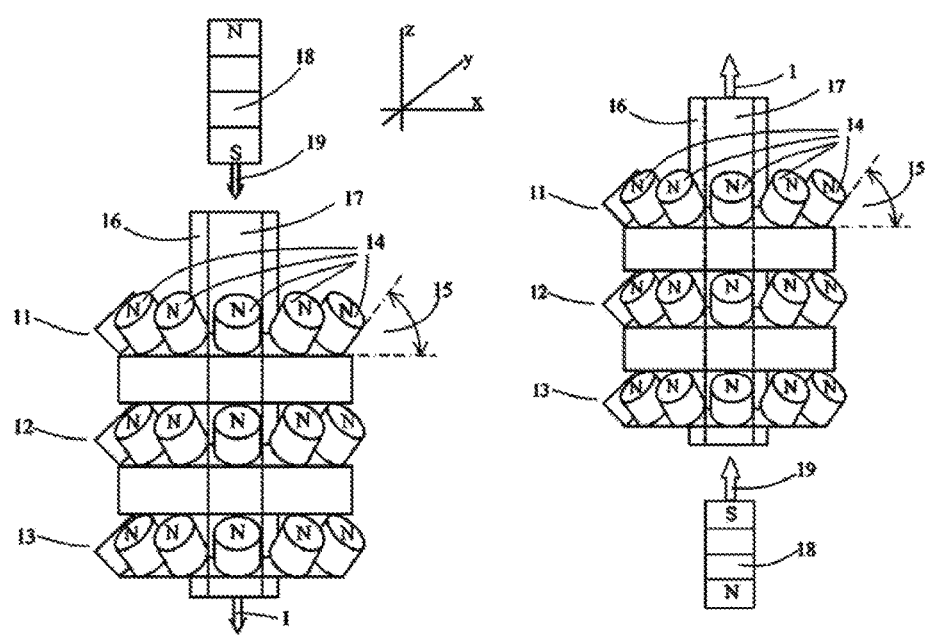
FIG. 23 is a side plan view illustrating a "duality" in relation to FIG. 1, in which the permanent magnet projectile has its orientation inverted and then is placed into the opposite end of the permanent magnet projectile movement channel as in FIG. 1, which the same projection result but in the opposite direction.

FIG. 23 illustrates a "duality" in relation to FIG. 1, in which the permanent magnet projectile has its orientation inverted and then is placed into the opposite end of the permanent magnet projectile movement channel as in FIG. 1, with the same projection result but in the opposite direction. The duality circumstance in the right hand side of FIG. 23 requires less force for insertion, with a corresponding lesser force of expulsion. This duality dependency is easily understood in the following way:

Start with FIG. 1 which is the left hand diagram in FIG. 23. Insert the permanent magnet projectile 18 as shown. When the projectile is expelled from the bottom in the shot direction 1, there is a repelling force from the fixed magnet rings operating on the projectile. Therefore, were the projectile in that position at the bottom to have its polarity inverted, the repulsive force would reverse to attraction, and the projectile would be drawn into the channel and shot through in the opposite direction, as is illustrated in the right hand side drawing of FIG. 23.

We may state this by observing that if the polar alignment of the projectile comprising at least one permanent magnet is introduced with a particular duality-dependent orientation into the permanent magnet projectile movement channel in accordance with this duality, the magnetic forces acting between the permanent magnet rings and the projectile will motivate the permanent magnet projectile relative to the channel.

Note that within all of the linear configurations of magnet rings disclosed herein, there is a plurality of said magnet ring tiers, serially aligned along the central core, with the polar alignments of the permanent magnets within each tier aligned in the same direction as the polar alignments of the permanent magnets within each adjacent tier. However, for the ring configuration were some small misalignment needs to be introduced from one tier to the next in order to introduce the requisite curvature for the ring, there is a plurality of magnet ring tiers, serially aligned along the central core, with the polar alignments of the permanent magnets within each tier aligned in substantially the same direction as the polar alignments of the permanent magnets within each adjacent tier, up to a slight curvature configured into the apparatus to fabricate the plurality of tiers into a permanent magnet wheel.

Before concluding, we review some additional embodiments and applications which might be realized by launching magnetic projectiles and motivating linear and rotational motion, using permanent magnets or magnetized bodies, in the manner that has been described and illustrated here.

One may use such configurations of magnets to propel magnets with attached non-magnetic masses as projectiles.

Components may be made of varying angles, sizes, numbers of magnets and geometries to achieve some desired propulsion, such as in toy guns or real guns, as described.

As noted, the magnets comprising the various rings may be permanent magnets, or may be or electromagnetic coils configured to create magnetic fields substantially equivalent to those of permanent magnets.

The magnetic configuration of this invention may perhaps be used to explain coronal mass ejections.

These configurations may be used for braking or stopping as well as promoting forward motion. Applications could include transportation rails and the like.

These configurations can be used for the storage of energy and momentum.

As disclosed in relation for FIG. 22, the magnetic components can be surrounded by conventional wound wire coils and be used for generation of electricity by magnetic mass transport and Faraday's law of induction. And, as discussed, known principles of turbine/rotor operations can be used to harness energy from the rotational motion of the magnet wheel.

These magnet configurations can used to deliver mechanical energy impulses of given sizes and powers for, e.g., construction jackhammers and the like.

They may also be used for mass transport of magnetized material, or materials suspended in or attached by attraction to ferro-fluids at the nanoscale or everyday dimensions. For example this may include magnetic ions attached around a carbon nanotube at an angle.

And, these may be used to attenuate or amplify magnetic and electromagnetic signals and fields by various geometries of construction.

The knowledge possessed by someone of ordinary skill in the art at the time of this disclosure, including but not limited to the prior art disclosed with this application, is understood to be part and parcel of this disclosure and is implicitly incorporated by reference herein, even if in the interest of economy express statements about the specific knowledge understood to be possessed by someone of ordinary skill are omitted from this disclosure. While reference may be made in this disclosure to the invention comprising a combination of a plurality of elements, it is also understood that this invention is regarded to comprise combinations which omit or exclude one or more of such elements, even if this omission or exclusion of an element or elements is not expressly stated herein, unless it is expressly stated herein that an element is essential to applicant's combination and cannot be omitted. It is further understood that the related prior art may include elements from which this invention may be distinguished by negative claim limitations, even without any express statement of such negative limitations herein. It is to be understood, between the positive statements of applicant's invention expressly stated herein, and the prior art and knowledge of the prior art by those of ordinary skill which is incorporated herein even if not expressly reproduced here for reasons of economy, that any and all such negative claim limitations supported by the prior art are also considered to be within the scope of this disclosure and its associated claims, even absent any express statement herein about any particular negative claim limitations.

Finally, while only certain preferred features of the invention have been illustrated and described, many modifications, changes and substitutions will occur to those skilled in the art. It is, therefore, to be understood that the appended claims are intended to cover all such modifications and changes as fall within the true spirit of the invention.

I claim:

1. A magnetic apparatus to motivate linear or rotational motion, comprising:
   at least one magnet ring tier comprising a ring of a plurality of permanent magnets;
   a central core comprising a permanent magnet projectile movement channel, an axis of said channel aligned in a direction normal to a geometric plane defined by said magnet ring, and running through a geometric center of said magnet ring; and each of said permanent magnets mounted in said ring at a mount angle thereof, with said permanent magnets' polar alignments parallel to said central core all oriented in the same direction; wherein:

when a polar alignment of a projectile comprising at least one permanent magnet is introduced with a particular duality-dependent orientation into said permanent magnet projectile movement channel, the magnetic forces acting between said ring magnets and said projectile would be capable of motivating said permanent magnet projectile relative to said channel.

2. The apparatus of claim 1, said at least one magnet ring tier further comprising a plurality of magnet ring tiers, serially aligned along said central core, with the polar alignments of the permanent magnets within each tier aligned with the polar alignments of the permanent magnets within each adjacent tier.

3. The apparatus of claim 2, configured to project said permanent magnet projectile out of an opposite end of said permanent magnet projectile movement channel.

4. The apparatus of claim 1, said at least one magnet ring tier further comprising a plurality of magnet ring tiers, serially aligned along said central core, with the polar alignments of the permanent magnets within each tier aligned in substantially the same direction as the polar alignments of the permanent magnets within each adjacent tier, up to a slight curvature for configuring said plurality of tiers into a permanent magnet wheel.

5. The apparatus of claim 4:

said plurality of said magnet ring tiers configured into a permanent magnet wheel;

said permanent magnet projectile movement channel running through a circumference of said permanent magnet wheel;

a central origin of said permanent magnet wheel mounted on an axle; and said projectile comprising at least one permanent magnet mounted to a fixed position, situated into said permanent magnet projectile movement channel, and said projectile oriented with its polar alignment in a particular duality-dependent orientation relative to the polar alignments of said permanent magnets; wherein:

when rotation is imparted to said wheel in the direction along which the relative magnet configurations would otherwise facilitate the projection of said permanent magnet projectile if it were not fixed, the magnetic interactions between said magnets in the wheel and said permanent magnet projectile motivate continued rotation of said permanent magnet wheel.

6. The apparatus of claim 5, further comprising an energy extraction apparatus for extracting energy from said rotation of said permanent magnet wheel, configured to utilize said permanent magnet wheel as a rotor.

7. The apparatus of claim 5, further comprising a plurality of electric wire coil windings with closed magnetic flux surfaces thereof proximate said permanent magnets of said magnet rings, such that the magnetic fields of said permanent magnet wheel with a time-dependency resulting from the configuration of the permanent magnets of said wheel are configured to pass through closed magnetic flux surfaces of said coils and thereby induce an electric current flow through said electric wires using Faraday's law of induction.

8. A method to motivate linear or rotational motion using a magnetic apparatus, comprising:

providing at least one magnet ring tier comprising a ring of a plurality of permanent magnets;

providing a central core comprising a permanent magnet projectile movement channel, with an axis of said channel aligned in a direction normal to a geometric plane defined by said magnet ring, and running through a geometric center of said magnet ring;

mounting each of said permanent magnets in said ring at a mount angle thereof, with said permanent magnets' polar alignments parallel to said central core all oriented in the same direction;

orienting the polar alignment of a projectile comprising at least one permanent magnet in a particular duality-dependent orientation relative to said polar alignments of said permanent magnets on said magnet ring parallel to said central core; and introducing said permanent magnet projectile into said permanent magnet projectile movement channel; wherein:

the magnetic forces acting between said ring magnets and said projectile are capable of motivating said permanent magnet projectile relative to said channel.

9. The method of claim 8, said at least one magnet ring tier further comprising providing a plurality of magnet ring tiers, serially aligned along said central core, with the polar alignments of the permanent magnets within each tier aligned with the polar alignments of the permanent magnets within each adjacent tier.

10. The method of claim 9, further comprising motivating said permanent magnet projectile relative to said permanent magnet projectile movement channel and projecting said permanent magnet projectile out of an opposite end of said channel.

11. The method of claim 8, said at least one magnet ring tier further comprising providing a plurality of magnet ring tiers, serially aligned along said central core, with the polar alignments of the permanent magnets within each tier aligned in substantially the same direction as the polar alignments of the permanent magnets within each adjacent tier, up to a slight curvature for configuring said plurality of tiers into a permanent magnet wheel.

12. The method of claim 11, further comprising:

configuring said plurality of said magnet ring tiers into a permanent magnet wheel;

providing said permanent magnet projectile movement channel running through a circumference of said permanent magnet wheel;

mounting a central origin of said permanent magnet wheel on an axle; and mounting said projectile comprising at least one permanent magnet to a fixed position, situated into said permanent magnet projectile movement channel;

orienting said permanent magnet projectile with its polar alignment in a particular duality-dependent orientation relative to the polar alignments of said permanent magnets;

imparting rotation to said wheel in the direction along which the relative magnet configurations would otherwise facilitate the projection of said permanent magnet projectile if it were not fixed; and motivating continuing rotation of said permanent magnet wheel responsive to the magnetic interactions between said magnets in said wheel and said permanent magnet projectile.

13. The method of claim 12, further comprising extracting energy from said rotation of said permanent magnet wheel, using an energy extraction apparatus utilizing said permanent magnet wheel as a rotor.

14. The method of claim 12, further comprising extracting energy from said rotation of said permanent magnet wheel by:
providing a plurality of electric wire coil windings with closed magnetic flux surfaces thereof proximate said permanent magnets of said magnet rings; and
inducing an electric current flow through said electric wires, from the magnetic fields of said permanent magnet wheel, with a time-dependency resulting from the configuration of the permanent magnets of said wheel passing through closed magnetic flux surfaces of said coils, using Faraday's law of induction.

15. A method of manufacturing energy, comprising:
providing at least one magnet ring tier comprising a ring of a plurality of permanent magnets;
providing a central core comprising a permanent magnet projectile movement channel, with an axis of said channel aligned in a direction normal to a geometric plane defined by said magnet ring, and running through a geometric center of said magnet ring;
mounting each of said permanent magnets in said ring at a mount angle thereof, with their said permanent magnets' polar alignments parallel to said central core all oriented in the same direction;
orienting the polar alignment of a projectile comprising at least one permanent magnet in a particular duality-dependent orientation relative to said polar alignments of said permanent magnets on said magnet ring parallel to said central core;
introducing said permanent magnet projectile into said permanent magnet projectile movement channel; and
extracting said energy by the magnetic forces acting between said ring magnets and said projectile motivating said permanent magnet projectile relative to said channel.

16. The method of claim 15, said process further comprising extracting said energy by said providing at least one magnet ring tier comprising providing a plurality of magnet ring tiers, serially aligned along said central core, with the polar alignments of the permanent magnets within each tier aligned with the polar alignments of the permanent magnets within each adjacent tier.

17. The method of claim 16, said process further comprising extracting said energy by motivating said permanent magnet projectile relative to said permanent magnet projectile movement channel and projecting said permanent magnet projectile out of an opposite end of said channel.

18. The method of claim 15, said process further comprising extracting said energy by said providing at least one magnet ring tier comprising providing a plurality of magnet ring tiers, serially aligned along said central core, with the polar alignments of the permanent magnets within each tier aligned in substantially the same direction as the polar alignments of the permanent magnets within each adjacent tier, up to a slight curvature for configuring said plurality of tiers into a permanent magnet wheel.

19. The method of claim 18, said process further comprising extracting said energy by:
configuring said plurality of said magnet ring tiers into a permanent magnet wheel;
providing said permanent magnet projectile movement channel running through a circumference of said permanent magnet wheel;
mounting a central origin of said permanent magnet wheel on an axle; and
mounting said projectile comprising at least one permanent magnet to a fixed position, situated into said permanent magnet projectile movement channel;
orienting said permanent magnet projectile with its polar alignment in a particular duality-dependent orientation relative to the polar alignments of said permanent magnets;
imparting rotation to said wheel in the direction along which the relative magnet configurations would otherwise facilitate the projection of said permanent magnet projectile if it were not fixed; and
motivating continuing rotation of said permanent magnet wheel responsive to the magnetic interactions between said magnets in said wheel and said permanent magnet projectile.

20. The method of claim 19, said process further comprising extracting said energy from said rotation of said permanent magnet wheel, using an energy extraction apparatus utilizing said permanent magnet wheel as a rotor.

21. The method of claim 19, said process further comprising further comprising extracting said energy from said rotation of said permanent magnet wheel by:
providing a plurality of electric wire coil windings with closed magnetic flux surfaces thereof proximate said permanent magnets of said magnet rings; and
inducing an electric current flow through said electric wires, from the magnetic fields of said permanent magnet wheel, with a time-dependency resulting from the configuration of the permanent magnets of said wheel passing through closed magnetic flux surfaces of said coils, using Faraday's law of induction.

* * * * *